UNITED STATES PATENT OFFICE.

HILBERT W. ENGLISH, OF BUFFALO, NEW YORK.

FLOOR-SMOOTHING COMPOSITION.

1,077,131. Specification of Letters Patent. Patented Oct. 28, 1913.

No Drawing. Application filed December 28, 1912. Serial No. 739,053.

*To all whom it may concern:*

Be it known that I, HILBERT W. ENGLISH, a citizen of the United States, residing at Buffalo, in the county of Erie and State of New York, have invented a new and useful Composition of Matter to be Used for Smoothing Rough or other Floor Surfaces for Dancing or other Purposes, of which the following is a specification.

My composition consists of the following ingredients, combined in the proportions stated, viz:

Boracic acid (commercial) ---- 100 pounds.
Corn starch (commercial) ---- 10 pounds.
Soapstone ------------------- 10 pounds.
Soda-ash (sodium carbonate) - 5 pounds.

These ingredients are to be thoroughly mingled by putting them through a sieve or other suitable process by which the several ingredients may be thoroughly incorporated with each other.

In using the above named composition no special preparation of the floor to be smoothed is necessary. The composition is sprinkled over the floor to be treated and lightly brushed over with broom or floor brush to cause an even distribution of the composition. Under the feet of the dancers the composition is worked into the interstices of the treated floor forming a smooth and slippery surface similar to and equal to a floor that has been waxed.

The object of my invention is to provide a cheap and easily applied composition for treating rough floors for dancing or other purposes requiring a smooth and slippery surface.

I claim:

1. The herein-described composition of matter, consisting of boracic acid, corn starch, soda-ash, and soapstone, substantially as described and for the purpose specified.

2. The herein-described composition of matter for smoothing rough or other floors, consisting of boracic acid one hundred pounds, corn starch 10 pounds, soapstone 10 pounds, soda-ash 5 pounds, substantially as described.

HILBERT W. ENGLISH.

Witnesses:
CHAS. J. DEAN,
D. H. HARPER.

Copies of this patent may be obtained for five cents each, by addressing the "Commissioner of Patents, Washington, D. C."